United States Patent [19]

Pratt et al.

[11] Patent Number: 5,054,316

[45] Date of Patent: Oct. 8, 1991

[54] VOLUMETRIC MEASURING APPARATUS

[76] Inventors: Keith Pratt, 12875 Twyla La., Hartland, Mich. 48029; Duane D. Muelling, 742 Birdsong, Milford, Mich. 48381

[21] Appl. No.: 577,674

[22] Filed: Sep. 4, 1990

[51] Int. Cl.$^5$ .............................................. G01F 17/00
[52] U.S. Cl. ...................................................... 73/149
[58] Field of Search ............................. 73/149, 290 V

[56] References Cited

U.S. PATENT DOCUMENTS

| | | | |
|---|---|---|---|
| 2,666,326 | 1/1954 | Poole et al. | 73/149 |
| 2,960,678 | 11/1960 | Beard et al. | 73/290 V |
| 3,075,382 | 1/1963 | Mathias | 73/149 |
| 3,324,716 | 6/1967 | Roberts | 73/149 |
| 3,489,002 | 1/1970 | Thompson | 73/149 |
| 3,494,185 | 2/1970 | Watanabe et al. | 73/149 |
| 4,448,065 | 5/1984 | Meuaer | 73/119 |
| 4,811,595 | 3/1989 | Marciniak et al. | 73/149 |

*Primary Examiner*—Robert Raevis
*Attorney, Agent, or Firm*—Krass & Young

[57] ABSTRACT

The present invention provides for an acoustical volumetric measuring apparatus which utilizes a variable volume standard cavity. The variable volume standard cavity is preferably formed of a threaded two-piece cylinder which changes volume upon rotation of one piece relative to other. Further, the variable volume standard cavity is calibrated to externally display the current volume setting. This allows for simplified comparisons in determining the volume of an unknown cavity. The simplified comparisons allow for less expensive components to be utilized.

20 Claims, 3 Drawing Sheets

VOLUMETRIC MEASURING APPARATUS

FIELD OF THE INVENTION

This invention relates to volumetric measuring apparatus for measuring the volume of cavities independent of their shape.

BACKGROUND OF THE INVENTION

Internal combustion engines utilize multiple combustion spaces defined within the cylinders of the engine to contain and direct the forces resulting from the combustion of fuel therein. These combustion spaces are typically irregularly shaped and vary in volume depending on the location of the piston within the cylinder. For an efficient and balanced engine, the combustion spaces in all engine cylinders must be calibrated to produce identical volumes at the time of fuel detonation. Such a balanced engine produces an even distribution of power to the crank shaft and consistent fuel consumption among the engine cylinders.

Helmholtz acoustic resonators have been utilized to determine the volume of an unknown test cavity. A Helmholtz acoustic resonator utilizes low frequency resonating waves to produce acoustical vibrations from within various cavities. The acoustical vibrations depend solely on the volume of cavity independent of its geometry. Resonating waves are directed into the unknown test cavity, producing an acoustical vibration corresponding to the unknown volume of the test cavity. Additionally, resonating waves are directed into a standard volume cavity, producing a standard acoustical vibration corresponding to a known volume. Sensors are positioned to detect these discrete acoustical vibrations. If the vibrations are identical in amplitude and frequency, the volumes are also identical. If the vibrations are different, the difference between the frequencies corresponds to the differences between the volumes. Examples of such acoustical-measuring apparatus include Poole et al., U.S. Pat. No. 2,666,326 and Mathias, U.S. Pat. No. 3,075,382.

The principle of the Helmholtz resonator is based on the fact that the resonance frequency generated by an acoustic resonator having an access passage is dependent on the volume of the resonator cavity and the dimensions of the access passageway. If the access passageway has a small volume relative to the resonator cavity, the resonance frequency is based on the volume of the resonator cavity alone. The resonance frequency is determined independent of the geometry or shape of the resonator cavity. Therefore, the volume of the cavity is solely as function of the resonance frequency of the cavity.

The prior art utilizes this principle by comparing a resonant frequency signal generated from within an unknown volume cavity to a resonant frequency signal generated from within a known (or standard) volume cavity. The difference in these frequencies is a measure of the volume of the unknown cavity compared to the volume of the standard cavity. More precisely, the volume of the unknown cavity is a function of the difference between the generated frequencies.

Typically, these devices utilize a single resonator associated with the unknown volume cavity which was compared to an absolute value produced from a known volume standard cavity. This allows for external factors to influence the accuracy of the measuring device. When these devices utilize multiple resonators, such as is disclosed in U.S. Pat. No. 2,666,326, the effect of external factors are minimized. The standard volume cavities being positioned in close proximity to the unknown cavity so as to be equally affected by changes in pressure, temperature and/or humidity.

The prior art, however requires complex mathematical processing to determine the exact volume of an unknown cavity from the resonant frequency of a standard volume. The present invention offers a greatly simplified substitute for the current volumetric measuring devices and methodology.

SUMMARY OF THE INVENTION

The present invention provides for an acoustical volumetric measuring apparatus which permits simplified comparisons in determining the volume of an unknown cavity. The simplified comparisons allow for less expensive components to be utilized. To achieve this result, the present invention utilizes a variable volume standard cavity.

The variable volume standard cavity is preferably formed of a threaded two-piece cylinder which changes volume upon rotation of one piece relative the other. Further, the variable volume standard cavity is calibrated to externally display the current volume setting.

Sensors mount proximate the unknown and standard cavities to detect the resonate frequency of the signals generated by discrete resonators acting in association with the discrete cavities. The resonators attach to the respective cavities in a manner well known in the field of this invention. The generated signals are compared and the results are displayed through a simplified indicator mechanism.

In use, the variable volume standard cavity is adjusted until the frequencies generated within the cavities are identical to one another. When such a relationship occurs, the volume of the variable volume cavity is recorded, and the volume of the unknown cavity can be determined.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

Figure 1:
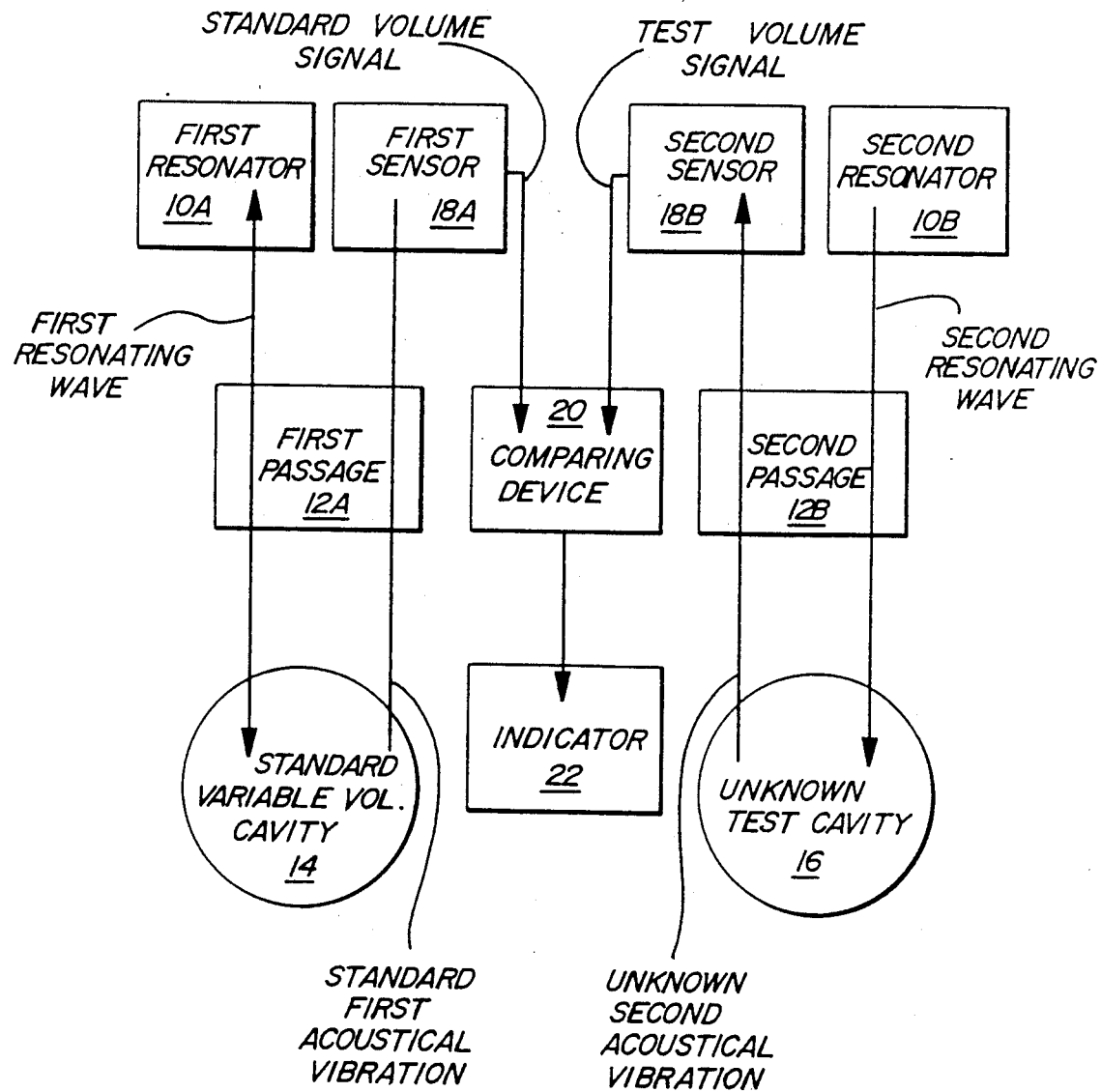
FIG. 1 is a block diagram of the present invention.

As shown in FIG. 1, the volumetric measuring apparatus of the preferred embodiment of the present invention utilizes a first resonator 10a to communicate through a first passage 12a with the standard variable volume cavity 14. In like manner, a second resonator 10b communicates through a second passage 12b with the unknown test cavity 16. The resonators generate discrete pneumatic resonating waves which are introduced into the cavities 14, 16 through passages 12a, 12b. Sensors 18a, 18b are positioned to detect the acoustical vibrations generated within the cavities 14, 16, respectively. A comparing device 20 electrically connected to the sensors 18a, 18b compares the signal corresponding to the standard volume to the signal corresponding to the test volume. The comparing device 20 then transmits a relationship signal to an indicator 22, and indicator 22 visually displays the harmonic relationship of the two signals.

Figure 2:
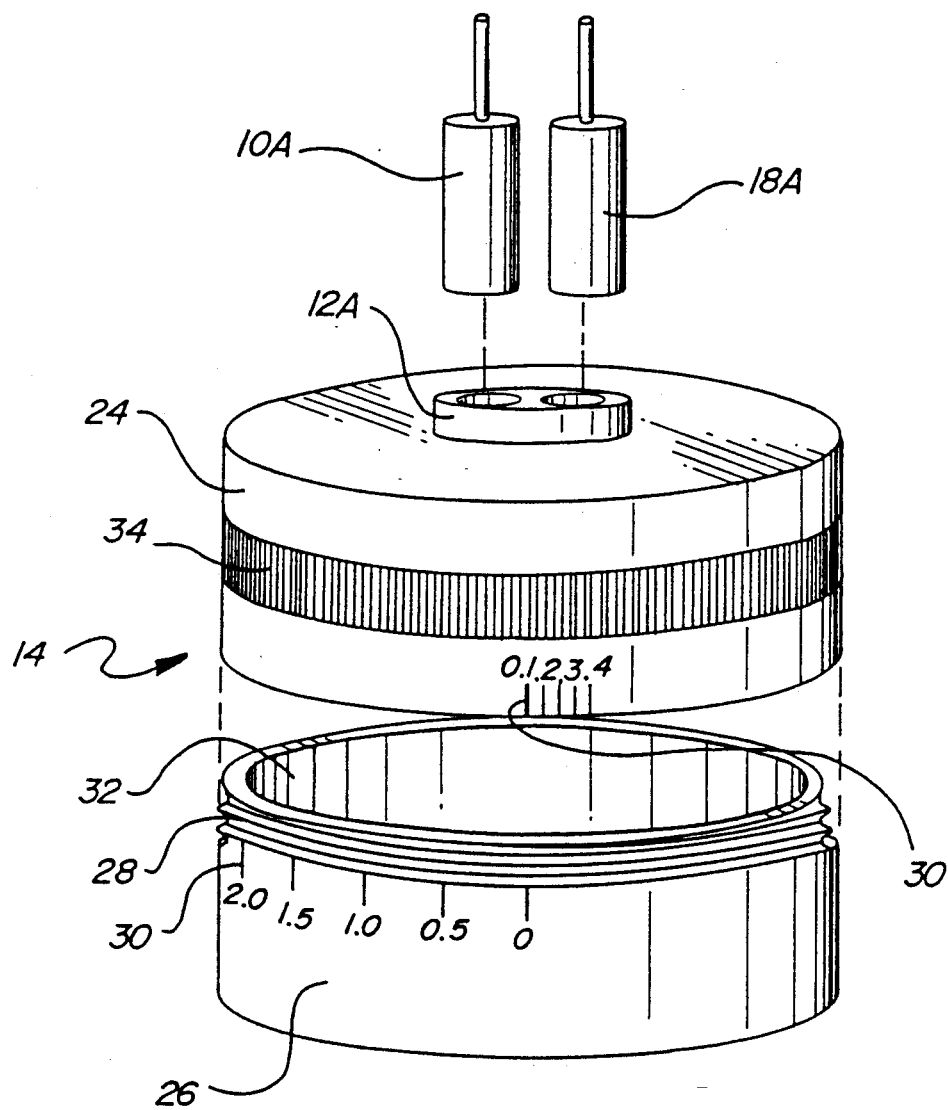
FIG. 2 is a perspective view of the variable volume cavity of the present invention.

More specifically, with reference to FIG. 2, the standard variable volume cavity 14 comprises a two-piece threaded cylindrical housing. A first section 24 includes the first passage 12a adapted to receive the first resonator 10a and first sensor 18a. Further, the first section 24 threadably engages the threaded portion 28 of second section 26. A series of indicator marks 30 are positioned on both first section 24 and second section 26. The variable volume cavity 14 is calibrated so that the referenced marks 30 read 0 when the cavity is fully closed. Upon rotation of the first section 24 about second section 26, the volume of the interior 32 of the variable volume cavity 14 is displayed by the reference marks 30. In this manner, the volume of the interior 32 of variable volume cavity 14 can be determined by viewing which reference marks from the first section 24 and second section 26 are aligned and adding the corresponding volumetric measures together to achieve the standard volume.

To aid in rotation of the first section 24 about second section 26, fluted grip sections 34 is disposed about the circumference of the cylindrical sections 24,26 to provide a gripping surface. In this manner, controlled rotation of the threaded sections can be manually achieved.

The resonators 10a, 10b are preferably of the whistle type utilizing a supply of pressurized air to create a perceivable vibration. The resonators 10a, 10b are connected to a supply of pressurized air and generate detectable vibrations as air passes through the body of each resonator 10. These vibrations are directed into respective cavities 14, 16. The cavities 14, 16 modulate the respective vibrations dependent on the volume of each cavity 14, 16. Preferably, the connection of the resonators allows communication between the resonators 10a, 10b to provide for variations in pressure of the air supply to mutually affect the vibrations.

Sensors 18a, 18b are positioned to allow the air to pass out of the cavities and to detect the acoustical vibrations generated by the resonators 10a, 10b, after the vibrations are modulated by the cavities 14, 16. In the preferred embodiment, a resonator 10b and sensor 18b are disposed in a passage 12b which is adapted to engage the spark plug hole on an engine to communicate with a respective engine cylinder as the unknown test cavity 16.

Figure 3:
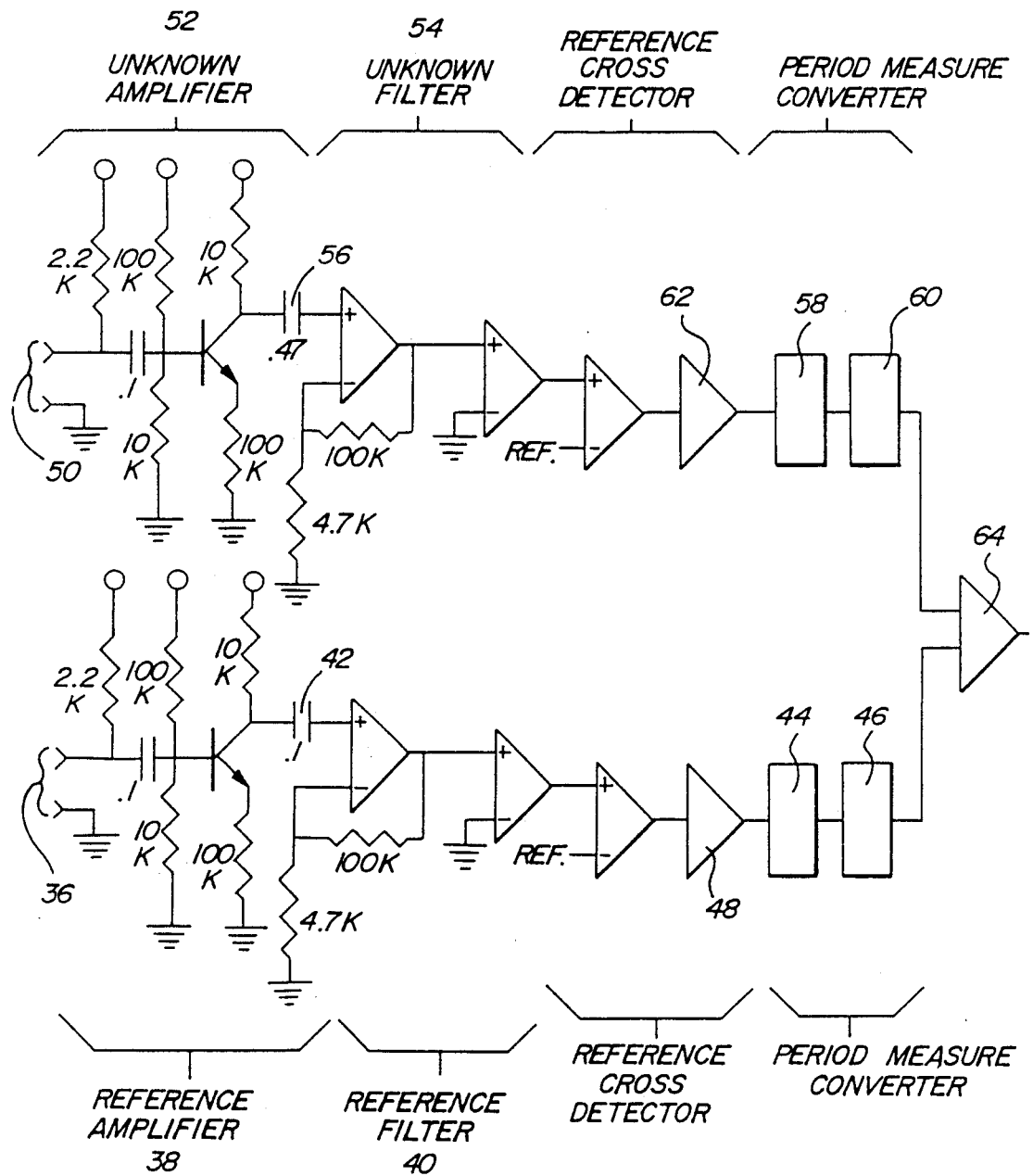
FIG. 3 is a circuit drawing of a typical comparing device.

The individual signals from the first and second sensors 18a,18b are compared by comparing device 20. With reference to FIG. 3, the standard volume signal input 36 processes the standard volume signal through a reference signal amplifier 38 and reference signal filter 40. Filter 40 limits the signal to 1,000 Hz. at 18 db/octave due to the 0.1 microfarads value of the capacitor 42. The signal then is cross-referenced through a reference signal cross detector system and passes through an analog-to-digital converter 44 and latch 46. A buffer 48 is suitably disposed to prevent feedback into the reference cross detector system. Similarly, the test volume signal input 50 passes through a test signal amplifier 52 and test signal filter 54. The value of this filter, however, is limited to 500 Hz. at 18 db/octave due to the 0.47 microfarads value of the capacitor 56. The signal is cross-referenced through a cross detector system and passes through an analog-to-digital converter 58 and latch 60. This half of the circuit is also protected with a buffer 62 preventing feedback to the cross detector system.

The numeric digital value produced by the analog-to-digital converters 44,58 is stored in the latches 46,60. These values are compared in comparator 64. This comparator is capable of analyzing the numeric value of the signal which corresponds to the wave length of the first and second acoustical vibrations generated from cavities 14 and 16. By measuring the period of these wave lengths and comparing one to another, it can easily be determined whether the vibrations are of equal value or either low or high therefrom.

Figure 4:
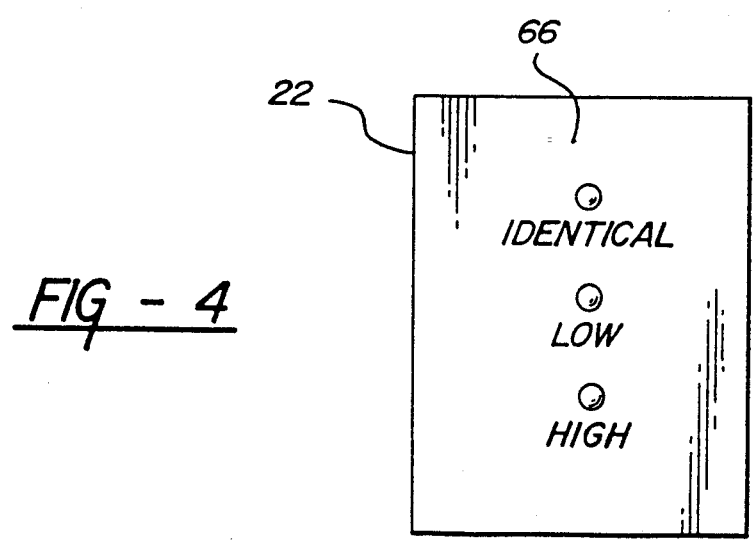
FIG. 4 is a drawing of the indicator panel.

The comparator 64 in FIG. 3 generates a signal which is sent to an indicator such a that shown in FIG. 4 whereby the relationship can be displayed. The indicator light series 66, having three LEDs, displays whether the signals at an equal value relationship or below or above that relationship. Utilizing the indicator light series, the variable volume cavity 14 can be adjusted to achieve an equal value relationship with the unknown cavity 16.

By way of example, the device is connected to an unknown volume cavity such as the cylinder of a vehicle engine in a means well known in the industry. Pneumatic resonating waves are generated and directed into the standard cavity 14 and the unknown cavity 16 resulting in discrete acoustical vibrations which are thereafter compared. The variable volume cavity 14 is adjusted until these signals achieve an equal value relationship with one another. This adjustment is facilitated by the series of indicator lights 66 which displays the direction in which the current volumetric setting of the standard variable volume cavity 14 is removed from an equal value relationship. Once the equal value relationship is achieved the volume value of the variable volume cavity 14 can be determined from the reference marks 30 thereon. The volume of the standard cavity 14 is determined by addition of the numeric values of the reference marks 30 which align together on both sections 24,26 of the standard cavity 14. This known volume of the variable volume cavity corresponds exactly to the volume of the unknown cavity. In summary, identical frequencies have identical volumes.

The present invention can be utilized in any number of embodiments. The key factor being the variable volume standard cavity. In fact in the most basic form of the invention, physical whistles can be substituted for the sensor, comparing device, and indicator assemblies and audible signals generated. The variable volume cavity 14 could then be adjusted until the audible tones were identical. This methodology is aided by the fact that a pulsing effect can be heard as the tones near one another; an effect which disappears when the tones are identical. Any number of alternatives embodiments of the device can be envisioned without departing from the scope of the invention herein.

Having thus disclosed my invention, I now claim:

1. A device for determining the volume defined by an unknown volume cavity, comprising:
   an adjustable standard volume cavity defining a variable volume;
   a first acoustic resonating device communicating with said standard volume cavity;
   means for systematically activating said first acoustic resonating device and producing a first acoustical vibration determined by said standard volume cavity;

sensing means associated with said standard volume cavity for determining the acoustical properties of said first acoustical vibration determined by said standard volume cavity;

a second acoustic resonating device communicating with the unknown volume cavity;

means for systematically activating said second acoustic resonating device and producing a second acoustical vibration determined by the unknown volume of the unknown volume cavity;

sensing means associated with the unknown volume cavity for determining the acoustical properties of said second acoustical vibration determined by the unknown volume cavity;

means for comparing the acoustical properties of said first and second acoustical vibrations; and means for adjusting the volume of the standard volume cavity based on the results produced by said means for comparing the acoustical properties of said first and second acoustical vibrations to determine the volume of the unknown volume cavity.

2. A device of claim 1, wherein said standard volume cavity comprises a chamber having at least one movable side, said at least one moveable side being moveable to define a variable volume therein.

3. The device of claim 2, wherein said standard volume cavity comprises a cylindrical housing having a pair of sections, said pair of sections threadably engaging each other whereby rotation of one section relative the other varies the volume defined therein.

4. The device of claim 3, wherein said standard volume cavity includes indicator means for indicating the specific volume defined thereby:

5. The device of claim 4, wherein said means for indicating the specific volume include a first series of indicator marks disposed on the exterior of a first of said pair of sections calibrated to indicate the specific volume defined when compared with a second series of indicator marks disposed on the exterior of a second of said pair of sections.

6. The device of claim 1, wherein said means for comparing the acoustical properties of said first and second acoustical vibrations includes an electronic comparing device adapted to monitor said vibrations.

7. The device of claim 1, wherein said means for comparing the acoustical properties of said first and second acoustical vibrations includes means for indicating when said second vibration has a frequency in an equal value relation with the frequency of said first vibration.

8. The device of claim 7, wherein said means for comparing the acoustical properties of said first and second acoustical vibrations includes means for indicating when said second vibration has a frequency above the frequency of said first vibration.

9. The device of claim 7, wherein said means for comparing the acoustical properties of said first and second acoustical vibrations includes means for indicating when said second vibration has a frequency below the frequency of said first vibration.

10. A device for determining the volume defined by an unknown volume cavity, comprising:

a standard volume cavity defining a variable volume, said standard volume cavity comprising a substantially cylindrical chamber having a threaded mouth opening at one end, and a cap member configured to engage said threaded mouth opening of said substantially cylindrical chamber, whereby rotation of said cap member about said threaded mouth opening changes the volume of said standard volume cavity;

a first acoustic resonating device communicating with said standard volume cavity;

means for systematically activating said first acoustic resonating device and producing a first acoustical vibration determined by said standard volume cavity;

sensing means associated with said standard volume cavity for determining the acoustical properties of said first acoustical vibration determined by said standard volume cavity;

a second acoustic resonating device communicating with the unknown volume cavity;

means for systematically activating said second acoustic resonating device and producing a second acoustical vibration determined by the unknown volume of the unknown volume cavity;

sensing means associated with the unknown volume cavity for determining the acoustical properties of said second acoustical vibration determined by the unknown volume cavity;

a computer configured to compare the acoustical properties of said first and second acoustical vibrations; and indicator means for indicating when said second vibration has a frequency identical to the frequency of said first vibration.

11. The device of claim 10, wherein said indicator means further includes means for indicating when said second vibration has a frequency above the frequency of said first vibration.

12. The device of claim 10, wherein said indicator means further includes means for indicating when said second vibration has a frequency below the frequency of said first vibration.

13. A unitary standard volume cavity for use in a volumetric measuring apparatus having at least two acoustic resonators, one of said acoustic resonators communicating with said unitary standard volume cavity to produce a standard acoustical vibration, and the second of said acoustic resonators communicating with an unknown volume cavity to produce an unknown acoustical vibration, whereby said acoustical vibrations are compared to determine the volume of said unknown volume cavity, wherein the improvement comprises said unitary standard volume cavity defining a variable volume.

14. The device of claim 13, wherein said unitary standard volume cavity comprises a cylindrical housing having a pair of sections, said pair of sections threadably engaging each other whereby rotation of one section relative the other varies the volume defined therein.

15. The device of claim 13, wherein said unitary standard volume cavity includes indicator means for indicating the specific volume defined therein during use of the device.

16. The device of claim 13, wherein said unitary standard volume cavity defines a continuously variable volume.

17. A method of determining the volume of an unknown cavity, comprising the steps of:

providing a unitary adjustable standard volume cavity;

acoustically resonating said unitary adjustable standard volume cavity so as to produce a standard volume acoustic vibration;

acoustically resonating the unknown cavity so as to produce an unknown volume acoustic vibration;

sensing said standard volume acoustic vibration and said unknown volume acoustic vibration;

comparing said standard volume acoustic vibration and said unknown volume acoustic vibration;

adjusting said unitary adjustable standard volume cavity so as to vary the volume defined therein until said standard volume acoustic vibration and said unknown volume acoustic vibration achieve a known relationship relative one another; and determining the volume of said unknown cavity based on the volume of the unitary adjustable standard volume cavity and said known relationship.

18. The method of claim 17, wherein said step of providing a unitary adjustable standard volume cavity includes the step of providing a chamber having at least one movable side.

19. The method of claim 17, wherein said step of providing a unitary adjustable standard volume cavity includes the step of adjusting said unitary adjustable standard volume cavity so as to vary the volume defined therein until said standard volume acoustic vibration and said unknown volume acoustic vibration achieve an equal value relation relative one another.

20. The method of claim 17, wherein said step of providing a unitary adjustable standard volume cavity includes the step of providing a unitary adjustable standard volume cavity adapted to define a continuously variable volume.

* * * * *

UNITED STATES PATENT AND TRADEMARK OFFICE
CERTIFICATE OF CORRECTION

PATENT NO. : 5,054,316

DATED : October 8, 1991

INVENTOR(S) : Keith Pratt, et al.

It is certified that error appears in the above-identified patent and that said Letters Patent is hereby corrected as shown below:

Column 4, line 15, "a" should be --as--;

Column 5, line 33, ":" should be --.--;

Column 8, line 4, "providing a" should be --adjusting said--.

Signed and Sealed this

Sixteenth Day of March, 1993

Attest:

STEPHEN G. KUNIN

*Attesting Officer*

*Acting Commissioner of Patents and Trademarks*